United States Patent Office 3,498,981
Patented Mar. 3, 1970

3,498,981
SUBSTITUTED as-TRIAZINES
Billy M. Culbertson, Burnsville, Minn., assignor to Ashland Oil & Refining Company, Ashland, Ky., a corporation of Kentucky
No Drawing. Filed Nov. 8, 1966, Ser. No. 592,743
Int. Cl. C07d 55/10, 91/30; A01n 9/22
U.S. Cl. 260—248          7 Claims

ABSTRACT OF THE DISCLOSURE

Novel substituted monomeric and polymeric as-triazines have been prepared by the reaction of a mono or difunctional hydrazidine with a mono or a difunctional substituted glyoxal. The compositions are thermally stable and can be employed as corrosion inhibitors for lube oils, as coatings and further to provide a sensitive test for the presence of ferrous ions.

---

This invention relates to certain novel monomeric as-triazines and bis-as-triazines and to certain novel polymeric as-triazines, as well as to methods for their preparation and use.

As-triazines, which are also known as 1,2,4-triazines, have been known at least since the last century. Erickson, in "The 1,2,3- and 1,2,4-Triazines, Tetrazines and Pentazines," Interscience Publishers, New York (1956), at page 48 relates the early failure of Pinner to prepare as-triazines by reacting benzhydrazidine with glyoxal. On the other hand, Erickson states that 5-substituted and 5,6-disubstituted as-triazines would presumably be obtained by use of 1,2-dicarbonyl compounds other than glyoxal. More recently, Case, in "Journal of Organic Chemistry," vol. 30 (1965), p. 931, reports that certain hydrazidines react with diketones such as pyridil and benzil to give certain 3,5,6-trisubstituted as-triazines. Thus, heretofore, while certain as-triazines such as 3,5,6-trisubstituted as-triazines and methods for their preparation have been disclosed, the existence of 5-monosubstituted-, 3,5-disubstituted-, 3,3'-bis- and 5,5'-bis-as-triazines has not been disclosed.

It is therefore an object of the present invention to provide novel monomeric 5-monosubstituted and 3,5-disubstituted as-triazines, as well as methods for their preparation and use.

Another object of the present invention is to provide novel monomeric 3,3'-bis-as-triazines and 5,5'-bis-as-triazines, as well as methods for their preparation and use.

A further object of the present invention is to provide novel polymeric as-triazines, as well as methods for their preparation and use.

Other objects and advantages of the present invention will be apparent by reference to the following detailed description thereof.

The novel as-triazines of the present invention include monomeric as-triazines of Formula I:

(I) 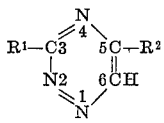

monomeric 5,5'-bis-as-triazines of Formula II:

(II) 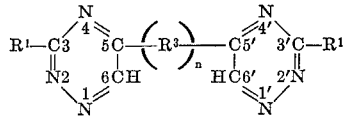

monomeric 3,3'-bis-as-triazines of Formula III:

(III) 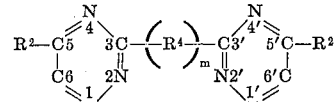

and polymeric as-triazines having the recurring unit of Formula IV:

(IV) 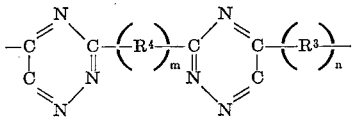

In Formulae I through IV, $R^1$ represents hydrogen or an unsubstituted or substituted monovalent hydrocarbon radical of 1 to 20 carbon atoms, $R^2$ represents an unsubstituted or substituted monovalent hydrocarbon radical of 1 to 20 carbon atoms, $R^3$ and $R^4$ represent the same or different unsubstituted or substituted divalent hydrocarbon radicals of 1 to 20 carbon atoms, $n$ equals 0 or 1, and $m$ equals 0 or 1.

As described above, in the monomeric as-triazines of Formulae I, II, and III, $R^1$ is hydrogen or more preferably a monovalent hydrocarbon radical or a substituted monovalent hydrocarbon radical, $R^2$ is a monovalent hydrocarbon radical or a substituted monovalent hydrocarbon radical, and $R^3$ and $R^4$ each represents a divalent hydrocarbon radical or a substituted divalent hydrocarbon radical. The hydrocarbon radicals represented by $R^1$, $R^2$, $R^3$, and $R^4$ contain from 1 to 20 carbon atoms and preferably from 1 to 10 carbon atoms. $R^1$, $R^2$, $R^3$, and $R^4$ are preferably aromatic radicals, substituted aromatic radicals, heteroaromatic radicals, or substituted heteroaromatic radicals. The substituents employed can be any non-interfering group such as, for example, OH, $NO_2$, SH, Cl, Br, F, I, OR, $CO_2H$, $CO_2R$, CN, —$SO_3H$, —$CF_3$, and lower alkyl wherein R is an alkyl radical of 1 to 10 carbon atoms. $R^1$, $R^2$ and $R^3$ are preferably derived from benzene or nitrogen-containing heteroaromatic compounds. The preferred nitrogen-containing heteroaromatic compounds are pyridine and pyrimidine.

Examples of specific compounds within the scope of the present invention includes, among others, 3-(2-pyridyl)-5-phenyl-as-triazine; 3-(2-pyridyl) - 5 - (p-nitrophenyl)-as-triazine; 3-(2-pyridyl)-5-(p-hydroxyphenyl)-as-triazine; 5,5'-(1,4-phenylene)-bis[3-(2-pyridyl)-as-triazine]; 5,5'-diphenyl-3,3'-bis-as-triazine; and 5,5'-bis(p-nitrophenyl)-3,3'-bis-as-triazine.

In general, the monomeric as-triazines of Formulae I, II, and III are prepared by reacting a mono- or a difunctional hydrazidine with a mono- or a difunctional substituted glyoxal. When the hydrazidine and the substituted glyoxal are both monofunctional, the resultant products are the as-triazines of Formula I; when the substituted glyoxal is difunctional and the hydrazidine is monofunctional, the resultant products are the 5,5'-bis-as-triazines of Formula II; when the hydrazidine is difunctional and the substituted glyoxal is monofunctional, the resultant products are the 3,3'-bis-as-triazines of Formula III. When both the hydrazidine and the substituted glyoxal are difunctional, the resultant product is a polymer having the recurring unit of Formula IV.

The monomeric as-triazines of Formulae I, II, and III are prepared by mixing or refluxing stoichiometric amounts of the appropriate hydrazidine and the appropriate substituted glyoxal at temperatures between about 0° C. and 200° C. and preferably between 50° C. and 100° C. in an inert solvent until no more water of reaction is produced, which generally occurs within about 10 minutes to 5 hours. Although temperatures outside these ranges can be employed, at temperatures much below 0° C. the reactants tend to solidify and at temperatures much above 300° C. the hydrazidines tend to decompose. Examples of suitable inert solvents include, among others, water, methanol, ethanol, dimethylformamide and compatible mixtures thereof. A particularly desirable solvent is a mixture of 3 parts of ethanol to 1 part of water. Although an excess of either the hydrazidine or the substituted glyoxal can be employed, no advantage results therefrom. Although the reaction proceeds rapidly without adjustment of the pH, it will also proceed in mildly alkaline and acid solutions. While atmospheric pressure is preferred, superatmospheric pressures as well as subatmospheric pressures can also be employed. Under certain conditions, subatmospheric pressures are desirable since this aids in removal of water of reaction, thus accelerating the reaction. The crude product produced as described above can optionally be decolorized with any decolorizing agent such as, a decolorizing charcoal. If crystallization is necessary from the solution, it can generally be effected by adding water. The as-triazines, which are generally insoluble in water, are then collected by conventional filtration techniques and washed with any of the above-described solvents. For additional purification, recrystallization can take place in very dilute solvents. Drying is generally effected under vacuum at, for example, 0.01 mm. Hg for a period of from 2 to 24 hours and preferably from 3 to 12 hours at temperatures between 20° C. and 300° C. and preferably between 50° C. and 100° C.

As previously stated, the polymeric as-triazines of the present invention are those having the recurring unit of Formula IV wherein $R^3$, $R^4$, $m$, and $n$ have the above-described meanings. A preferred polymer of the present invention is that having the recurring unit of Formula V:

(V) 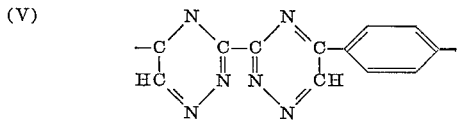

In general, the polymers are prepared by reacting the below described difunctional hydrazidines of Formula VII with difunctional substituted glyoxals of Formula IX at temperatures of 20° C. to 300° C. and preferably 80° C. to 200° C. for a period of 2 minutes to 5 hours until the reaction is complete, as determined by the cessation of evolution of water of reaction. At temperatures much below 20° C. the reaction proceeds at an uneconomically slow rate, and at temperatures much above 300° C. the hydrazidine reactant tends to decompose, although the polymer, once formed, is stable at temperatures much higher than 300° C.

The monofunctional hydrazidines useful in the present invention correspond to those of Formula VI:

(VI) 

wherein $R^1$ has the above-described meaning. Examples of specific monofunctional hydrazidines include, among others, phenyl hydrazidine; benzyl hydrazidine; methyl hydrazidine; ethyl hydrazidine; isobutyl hydrazidine; eicosyl hydrazidine; the pyridyl hydrazidines such as 2-pyridyl hydrazidine; quinolyl hydrazidine; thiazolyl hydrazidine; pyrimidyl hydrazidine; and phenanthryl hydrazidine, as well as their substituted derivatives.

The difunctional hydrazidines, which are also called amide-hydrazones, correspond to those of Formula VII:

(VII) 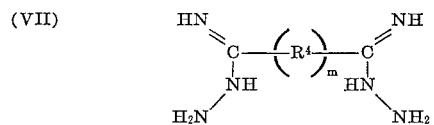

wherein $R^4$ and $m$ have the above-described meanings. Specific examples of difunctional hydrazidines include, among others, oxamide dihydrazone; malonamide dihydrazone; succinamide dihydrazone; glutaramide dihydrazone; adipamide dihydrazone; sebacamide dihydrazone; isophthalamide dihydrazone; terephthalamide dihydrazone; and pyridyldiamide dihydrazone.

The mono- and difunctional hydrazidines useful in the present invention are either known compounds or can be prepared by known reactions such as those described by Case. Alternatively, they may be prepared by the action of hydrazine on the corresponding thioamide, imido ether, or by direction action on the appropriate nitrile.

The monofunctional substituted glyoxals useful in the present invention correspond to those of Formula VIII:

(VIII) 

wherein $R^2$ has the same meaning as described above. Specific examples of substituted glyoxals include, among others, methyl glyoxal, ethyl glyoxal, isobutyl glyoxal, octadecyl glyoxal, p-hydroxyphenol glyoxal, p-nitrophenyl glyoxal, phenyl glyoxal, p-methylphenyl glyoxal, p-chlorophenyl glyoxal, p-methoxyphenyl glyoxal, p-phenoxyphenyl glyoxal, p-trifluoromethylphenyl glyoxal, p-bromophenyl glyoxal, and p-cyanophenyl gloxal.

Difunctional substituted glyoxals useful in the present invention are those corresponding to Formula IX:

(IX) 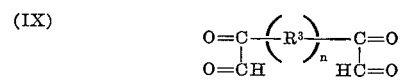

wherein $R^3$ and $n$ have the above-described meanings. Specific examples of difunctional substituted glyoxals include, among others, 1,4-diglyoxalyl benzene; 1,2-diglyoxalyl naphthalene; 1,3-diglyoxalyl pyridine; 1,4-diglyoxalyl pyrimidine; 1,3-diglyoxalyl-2-chlorobenzene; 1,4-diglyoxalyl - 3 - nitro-naphthalene; 1,2-diglyoxalyl-3-hydroxy-pyridine; 1,3-diglyoxalyl-4-bromopyrimidine; 1,3-diglyoxalyl benzene; 4,4'-diglyoxalyl diphenyl ether; 4,4'-diglyoxalyl diphenyl sulfide; and 4,4'-diglyoxalyl diphenyl sulfone.

The above-described glyoxals, which can be used in their pure or their hydrated form, are either known compounds or can be prepared according to procedures well-known in the art, as by the reaction of mono- or bis-acetyl aromatic or substituted aromatic compounds with sutiable oxidants such as selenium oxide (Riley reaction) in an inert solvent such as dioxane, tetrahydrofuran, acetone, methanol, ethanol, hexane, benzene, and the like.

The as-triazines and bis-as-triazines of the present invention which contain ferroin moieties

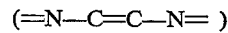

give a very sensitive test for the presence of ferrous ions. They are also useful as fungicides, herbicides, and corrosion inhibitors for lubricating oils. The polymers of the present invention exhibit excellent thermal stability and are useful as coatings for steam pipes, heat exchangers, and the like.

EXAMPLE 1

This example illustrates the synthesis of 3-(2-pyridyl)-5-phenyl-as-triazine having Formula X:

(X)
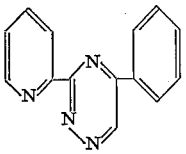

Phenylglyoxal hydrate (1.52 g., 0.01 mole) and 2-pyridyl hydrazidine (1.36 g., 0.01 mole) are each dissolved in equal amounts (25 ml.) of absolute ethanol. The two solutions are mixed and then refluxed for two hours. Following refluxing the reaction product is treated with, a decolorizing charcoal, then filtered, and finally diluted with water to effect crystallization of the product which is recovered as a yellow precipitate. The precipitate is collected by suction filtration, washed on the filter three times with distilled water, and then air-dried for 18 hours overnight at 20° C. and 50° relative humidity, and finally dried for 4 hours at 100° C. under 0.01 mm. Hg absolute pressure to give a 1.8 g. (theoretical 2.3 g.) yield of compound X having a melting point of 140° C. to 141° C. Compound X exhibits infrared spectrum characteristic of the as-triazine ring system.

Compound X (1 g.) is recrystallized from very dilute ethanol (10 ml. of ethanol in 100 ml. of water) and dried under vacuum (0.01 mm. Hg) 18 hours overnight at 100° C. This recrystallized product exhibits a melting point of 140.5° C. to 141° C.

The analysis calculated for $C_{14}H_{10}N_4$ (percent): C, 71.79; H, 4.27; N, 23.93 is found to be (percent): C, 71.61; H, 4.37; N, 23.94.

EXAMPLE 2

This example illustrates the synthesis of 3-(2-pyridyl)-5-(p-hydroxyphenyl)-as-triazine having Formula XI:

(XI)
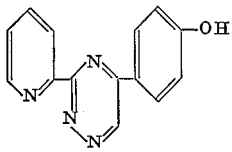

p-Hydroxyphenylglyoxal hydrate (3.36 g., 0.02 mole) and 2-pyridyl hydrazine (2.72 g., 0.02 mole) are each dissolved in equal amounts (60 ml.) of absolute ethanol. The two solutions are mixed and refluxed for one hour. The resultant solution is cooled to room temperature (20° C.) and permitted to sit overnight (18 hours). This solution is then flash-evaporated to obtain the desired crude, yellow crystalline compound XI.

This crude material is recrystallized from very dilute ethanol (10 ml. of ethanol in 100 ml. of water) and then dried under vacuum (0.01 mm. Hg) for 12 hours at 65° C. to obtain a 4.0 g. (theoretical 5.0 g.) yield of yellow crystalline compound XI having a melting point of 211° C. to 213° C. Compound XI exhibits an infrared absorption band characteristic of the as-triazine ring.

The analysis calculated for $C_{14}H_{10}N_4O$ (percent): C, 67.20; H, 4.00; N, 22.40 is found to be (percent): C, 66.39; H, 3.91; N, 22.65.

EXAMPLE 3

This example illustrates the synthesis of 3-(2-pyridyl)-5-(p-nitrophenyl)-as-triazine having Formula XII:

(XII)
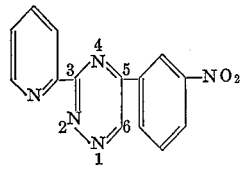

2-pyridyl hydrazidine (2.4 g., 0.0177 mole) and p-nitrophenylglyoxal hydrate (3.46 g., 0.0177 mole) are each dissolved in equal amounts (60 ml.) of absolute ethanol. The two solutions are mixed and heated at reflux. After ten minutes of reflux a copious amount of bright yellow precipitate begins to form. After refluxing for an additional 20 minutes and allowing the reaction mixture to cool, the precipitate is collected by suction filtration and washed on the filter three times with cold ethanol. The resulting crystals are dried under vacuum (0.01 mm. Hg) for 4 hours at 100° C. to obtain a 4.4 g. (theoretical 5.1 g.) yield of yellow crystalline compound XII having a melting point of 246° C. to 258° C. The resultant product exhibits infrared absorption bands characteristic of nitro and as-triazine moieties.

Without further purification the analysis calculated for $C_{14}H_9N_5O_2$ (percent): C, 60.21; H, 3.23; N, 25.09 is found to be (percent): C, 60.31; H, 3.21; N, 25.14.

EXAMPLE 4

This example illustrates the synthesis of 5,5'-(1,4-phenylene)-bis[3-(2-pyridyl)-as-triazine] having Formula XIII:

(XIII)
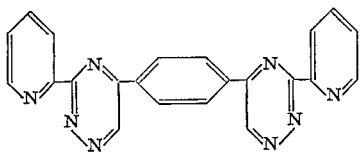

1,4-diglyoxalbenzene dihydrate (2.26 g., 0.001 mole) and 2-pyridyl hydrazidine (2.72 g., 0.002 mole) are each dissolved in equal amounts (50 ml.) of absolute ethanol. The two solutions are then mixed and refluxed for 10 minutes to form a yellow precipitate. The reaction mixture is refluxed an additional 60 minutes and then cooled to room temperature (20° C.). The precipitate is collected by suction filtration and washed on the filter three times with absolute ethanol. The product is dried under vacuum (0.01 mm. Hg) for 4 hours at 100° C. to obtain a 3.3 g. (theoretical 3.9 g.) yield of crude compound XIII having a melting point of 294° C. to 296° C. The product exhibits infrared absorption bands characteristic of the as-triazine ring. A sample (1 g.) is recrystallized from pyridine diluted with water (10 ml. of pyridine and 100 ml. of water).

The analysis calculated for $C_{22}H_{14}N_8$ of C, 67.69; H, 3.59; N, 28.71 is found to be: C, 66.76; H, 3.56; N, 28.09.

EXAMPLE 5

This example illustrates the synthesis of 5,5'-diphenyl-3,3'-bis-as-triazine having Formula XIV:

(XIV)
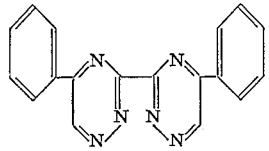

Using the synthesis and isolation procedure of Example 6, oxamide-dihydrazone (1.7 g., 0.145 mole) is dissolved in 50 ml. of dilute ethanol (70% ethanol). Phenylglyoxal (4.4 g., 0.029 mole) is dissolved in dilute ethanol (50 ml. of 70% ethanol). The two solutions are mixed and refluxed for ten minutes. At the end of this time, a yellow precipitate forms. The reflux is continued for one hour and the product is permitted to cool to room temperature (20° C.). The precipitate is collected by suction filtration and washed on the filter three times with dilute ethanol, and then dried under vacuum (0.01 mm. Hg) for 4 hours at 100° C. to obtain a 4.0 g. (theoretical 4.5 g.) yield of crude, light brown-colored compound XIV having a melting point of 242° C. to 274° C. This product is recrystallized from N,N-dimethylacetamide and then dried under vacuum (0.01 mm. Hg) for 4 hours at 100° C. to yield a purified compound XIV having a melting point of 244° C. to 246° C. This purified product exhibits infrared absorption bands characteristic of the as-triazine ring.

The analysis calculated for $C_{18}H_{12}N_6$ of C, 69.22; H, 3.87; N, 26.91 is found to be: C, 69.18; H, 3.86; N, 26.85.

EXAMPLE 6

This example illustrates the synthesis of 5,5'-bis-(p-nitrophenyl)-3,3'-bis-as-triazine having Formula XV:

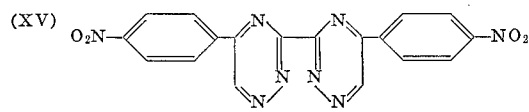

Oxamide-dihydrazone (2.32 g., 0.02 mole) and p-nitrophenyl glyoxal hydrate (7.88 g., 0.04 mole) are each dissolved in equal amounts (50 ml.) of dimethylformamide at 60° C. The two solutions are mixed and brought to reflux, whereupon a large amount of precipitation begins to form. The reaction mixture is refluxed for 5 minutes and cooled to room temperature (20° C.). The product is collected by suction filtration, washed on the filter three times with absolute ethanol, and then dried under vacuum (0.01 mm. Hg) for 4 hours at 100° C. to obtain a 7.80 g. (theoretical 8.04 g.) yield of crude compound XV.

For analysis, crude compound XV is recrystallized from pyridine and dried under vacuum (0.01 mm. Hg) for 4 hours at 100° C. to give a product having a melting point of 331° C. to 333° C. This product exhibits infrared spectrum absorption bands characteristic of nitro and as-triazine rings.

The analysis calculated for $C_{18}H_{10}N_8O_4$ of C, 53.73; H, 2.49; N, 27.86 is found to be: C, 53.11; H, 2.47; N, 27.74.

EXAMPLE 7

This example illustrates the utility of several monomers of the present invention as a qualitative test for the presence of ferrous ions.

Ferrous chloride (0.1 g.) is dissolved in water (1 ltr.) at 20° C. to form a ferrous ion-containing solution. To test tube quantities (5 ml.) of this solution is added one drop (ca. 0.05 ml.) of 0.1 N solutions of the following compounds dissolved in dimethylformamide to give the colors noted:

| Compound: | Color |
|---|---|
| 3 - (2 - pyridyl)-5-phenyl-as-triazine | Very deep purple. |
| 3 - (2-pyridyl) - 5 - (p-hydroxyphenyl)-as-triazine | Magenta. |
| 3 - (2-pyridyl - 5 - (p-nitrophenyl)-as-triazine | Purple. |
| 5,5' - (1,4-phenylene) - bis[3-(2-pyridyl)-as-triazine] | Deep blue. |

EXAMPLE 8

This example illustrates the synthesis of a polymer having the following recurring unit:

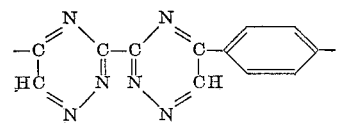

Oxamide-dihydrazone (2.05 g.) is dissolved in hexamethylphosphoramide (125 ml., at 60° C.), available from the Dow Chemical Company as "Dorcol." p-Diglyoxalbenzene dihydrate (4.00 g.) is added to this mixture. The resultant solution is heated for 3 hours at 195° C. and then cooled to room temperature (20° C.). The resultant viscous solution is poured, with stirring, into absolute methanol (700 ml.) and the dark precipitate so formed is collected by suction filtration. The precipitate is washed three times with absolute methanol and the washed material is dried under vacuum (0.2 mm. Hg) for 4 hours at 100° C. to obtain a 4.0 g. (theoretical 4.1 g.) yield of dark brown polymer having a melting point of greater than 450° C. The polymer is soluble in concentrated sulphuric acid and partially soluble in dimethylacetamide, dimethylformamide, and formic acid.

Infrared and ultraviolet spectra studies give absorption bands characteristic of the as-triazine ring. Differential thermal and gravimetric analysis demonstrates that the polymer has excellent thermal stability in both air and nitrogen to over 400° C.

What is claimed is:
1. A compound selected from the group consisting of
(a) as-triazines represented by the formula,

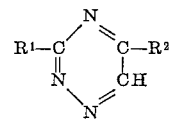

(b) 5,5'-bis-as-triazines represented by the formula

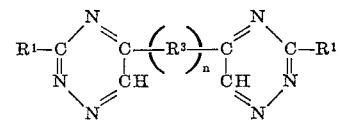

and (c) 3,3'-bis-as-triazines represented by the formula

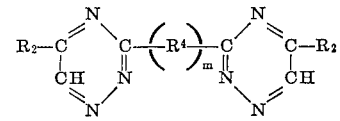

wherein
$R^1$ represents a nonvalent radical having from one to twenty carbon atoms selected from the group consisting of alkyl, carbocyclic aromatic, pyridyl, pyrimidyl, quinolyl and thiazoyl,
$R^2$ represents a monovalent radical selected from the group consisting of alkyl having from one to twenty carbon atoms, carbocyclic aromatic having from one to ten carbon atoms, pyridyl and pyrimidyl,
$R^3$ and $R^4$ represent divalent radicals selected from the group consisting of alkylene having from one to ten carbon atoms, carbocyclic aromatic having from one to ten carbon atoms, pyridylene and pyrimidylene,
$m$ is 0 or 1, $n$ is 0 or 1 and where $R^1$, $R^2$, $R^3$ and $R^4$ may be substituted with a substituent selected from the group consisting of —OH, —$NO_2$, —SH, —Cl, —Br, F, I, —CN, —$CO_2H$, —$CO_2R$, OR, $SO_3H$, and $CF_3$, where R represents an alkyl radical having from one to ten carbon atoms.
2. 3-(2-pyridyl)-5-phenyl-as-triazine, a compound of claim 1.
3. 3-(2-pyridyl) - 5 - (p-hydroxylphenyl)-as-triazine, a compound of claim 1.
4. 3-(2-pyridyl)-5-(p-nitrophenyl)-as-triazine, a compound of claim 1.
5. 5,5' - (1,4-phenylene)-bis[3-(2-pyridyl)-as-triazine], a compound of claim 1.
6. 5,5'-diphenyl-3,3'-bis-as-triazine, a compound of claim 1.

7. 5,5′-bis-(p-nitrophenyl)-3,3′-bis-as-triazine, a compound of claim 1.

References Cited
FOREIGN PATENTS
638,709   3/1962   Canada.

OTHER REFERENCES
Erickson et al., "The 1,2,3 and 1,2,4-Triazines, Tetrazines, and Pentazines," Interscience Pub., Inc., New York (1956) pp. 51–4.

Case, Journal Organic Chemistry, vol. 30, (1965) pp. 931–3.

HENRY R. JILES, Primary Examiner

J. M. FORD, Assistant Examiner

U.S. Cl. X.R.

71—91; 252—47, 50, 390, 408; 260—242, 566, 590, 594, 999